(12) United States Patent
Svedman et al.

(10) Patent No.: US 9,960,882 B2
(45) Date of Patent: May 1, 2018

(54) LINK ADAPTATION SYSTEMS AND METHODS

(75) Inventors: Patrick Svedman, Stockholm (SE); Mathias Riback, Danderyd (SE); Karl Werner, Hägersten (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1039 days.

(21) Appl. No.: 13/125,368

(22) PCT Filed: Nov. 12, 2008

(86) PCT No.: PCT/SE2008/051298
§ 371 (c)(1),
(2), (4) Date: Apr. 21, 2011

(87) PCT Pub. No.: WO2010/056161
PCT Pub. Date: May 20, 2010

(65) Prior Publication Data
US 2011/0194596 A1 Aug. 11, 2011

(51) Int. Cl.
*H04B 17/00* (2015.01)
*H04L 1/00* (2006.01)
*H04B 7/0413* (2017.01)
*H04B 7/0452* (2017.01)
*H04L 5/00* (2006.01)

(52) U.S. Cl.
CPC ......... *H04L 1/0026* (2013.01); *H04B 7/0413* (2013.01); *H04B 7/0452* (2013.01); *H04L 1/002* (2013.01); *H04L 1/0015* (2013.01); *H04L 1/0025* (2013.01); *H04L 5/006* (2013.01)

(58) Field of Classification Search
CPC ..... H04W 84/12; H04W 84/18; H04W 56/00; H04W 48/12; H04W 48/08; H04W 8/005; H04W 16/14; H04W 24/02; H04W 72/042; H04W 74/02; H04W 74/0816; H04W 40/005; H04W 40/10; H04W 40/22; H04L 1/0028; H04L 5/006; H04L 1/0001–1/0026; H04B 7/0452; H04B 7/0413; H04B 7/0632
USPC ........................................................ 375/224
See application file for complete search history.

(56) References Cited

U.S. PATENT DOCUMENTS

| | | | |
|---|---|---|---|
| 2003/0179756 A1* | 9/2003 | Cain ................... | H04B 7/0491 370/395.42 |
| 2005/0226153 A1* | 10/2005 | Scifres .................. | H04L 47/10 370/232 |
| 2006/0135080 A1* | 6/2006 | Khandekar et al. ............ | 455/69 |
| 2006/0285585 A1* | 12/2006 | Sampath ...................... | 375/227 |

(Continued)

OTHER PUBLICATIONS

International Search Report for PCT/SE2008/051298, dated Oct. 30, 2009.

(Continued)

*Primary Examiner* — Melanie Jagannathan
*Assistant Examiner* — Najeebuddin Ansari
(74) *Attorney, Agent, or Firm* — Withrow & Terranova, PLLC

(57) ABSTRACT

The present application discloses systems and methods for adjusting a back-off value for a rank. In some embodiment, the method includes the steps of: (a) determining whether the rank is underutilized and (b) in response to determining that the rank is underutilized, decreasing the back-off value as a function of time while the rank remains underutilized.

16 Claims, 11 Drawing Sheets

(56) References Cited

U.S. PATENT DOCUMENTS

| | | | |
|---|---|---|---|
| 2007/0005749 A1* | 1/2007 | Sampath | 709/223 |
| 2007/0183380 A1* | 8/2007 | Rensburg et al. | 370/338 |
| 2007/0263654 A1* | 11/2007 | Salokannel et al. | 370/448 |
| 2008/0299984 A1* | 12/2008 | Shimomura et al. | 455/446 |
| 2009/0086648 A1* | 4/2009 | Xu | H04B 7/0689 370/252 |
| 2009/0097456 A1* | 4/2009 | Zhu et al. | 370/336 |
| 2009/0135744 A1* | 5/2009 | Chaudhri | H04W 16/14 370/278 |
| 2009/0170437 A1* | 7/2009 | Bhattad et al. | 455/63.1 |
| 2009/0238086 A1* | 9/2009 | Ringstrom et al. | 370/252 |
| 2010/0002598 A1* | 1/2010 | Pan | H04B 7/063 370/252 |
| 2010/0029265 A1* | 2/2010 | Khandekar et al. | 455/423 |
| 2012/0113856 A1* | 5/2012 | Krishnaswamy | 370/252 |
| 2012/0213166 A1* | 8/2012 | Benveniste | 370/329 |

OTHER PUBLICATIONS

Jianchu Zhu et al., "Adaptive CQI Feedback and Efficient CQI Update Scheme for Codebook Based MU-MIMO in E-UTRA", *Vehicular Technology Conference*, Sep. 21, 2008, pp. 1-6.

\* cited by examiner

LINK ADAPTATION SYSTEMS AND METHODS

This application is the U.S. national phase of International Application No. PCT/SE2008/051298 filed 12 Nov. 2008 which designated the U.S., the entire contents of which is hereby incorporated by reference.

TECHNICAL FIELD

The present invention relates to wireless communications and, more specifically, to systems and methods related to link adaptation.

BACKGROUND

Channel fading is a fundamental characteristic of a wireless communication channel. Channel fading is the variability over time of the instantaneous conditions of the wireless communication channel. Channel-dependent adaptation of a transmission is one way to handle channel fading. When a channel is in a good state, it is possible to transmit data using a low level of error protection on the channel. In contrast, when the channel is in a bad fading state, a higher level of error protection is necessary, which causes a reduction in the information data rate. The level of error protection may, for example, be varied by changing the modulation format and channel coding rate. The information data rate is the number of transmitted information bits per second. In many wireless communication systems, a transmission is divided into blocks. It is possible to detect erroneous reception of a block, usually through a cyclic redundancy check (CRC). The ratio of incorrectly received blocks, either including or not including retransmitted blocks, is called the block-error rate (BLER).

In order to maximize the information data rate, the error protection level of the transmission should be adapted to the instantaneous channel conditions. This is often called "link adaptation." In practice, link adaptation is often implemented by aiming at a fixed BLER (e.g., a target BLER).

In a typical wireless communication system many parameters of the communication channel used by a transmitting device to transmit data to a receiving device (a.k.a., the forward channel) can not be reliably estimated from parameters of the reverse channel (i.e., the channel used by the receiving device to transmit data to the transmitting device). In practice, this means that the receiving device may be able to directly determine the instantaneous channel conditions of the forward channel, but the transmitting device is not able to do so. Accordingly, in order for the transmitting device to adapt its transmission to the receiving device, the receiver needs to provide feedback (e.g., transmit) to the transmitter information indicating the quality of the channel. In a wireless communication system where the parameters of the forward communication channel can be reliably estimated directly at the transmitter, the channel quality can be directly computed at the transmitter, without the need of feedback.

Typically, a receiving device indicates the quality of a channel to the transmitter by transmitting to the transmitter one or more scalar quantities known as channel quality indicator (CQI) values, which indicate the quality of a channel for the purpose of describing the channel's ability to support information transfer. For example, a CQI value can indicate a recommended modulation format and code-rate based on channel measurements. For instance, the CQI value can be a signal to interference plus noise power ratio (SINR) value computed by the receiving device based on channel measurements. In a communication system with multiple parallel channels, there may be several CQI values, indicating the channel quality of each parallel channel or of subsets of parallel channels.

In a wireless communication system with CQI feedback, the CQI values are estimated (or predicted) at the receiver. Typically, the estimation involves the estimation of the instantaneous communication channel properties as well as computations based on a model of parts of the transmitter and a model of parts of the receiver. In practice, the channel estimation is noisy and the models of parts of the transmitter and the receiver may be inaccurate. Furthermore, for time-variant communication channels, the delay between channel estimation or prediction and the adaptation of the link induces additional inaccuracies in the CQI estimation. Therefore, it is common practice to obtain a back-off value and modify an estimated CQI using the back-off value, either at the receiver or at the transmitter or on both sides. Using a back-off value to modify a CQI value may increase the level of error protection compared to the originally computed CQI, but it may also decrease the level of error protection. For example, if the CQI is in the form of a modulation and coding scheme, the back-off may decrease the code-rate of the coding scheme, thereby increasing the level of error protection, compared to the originally computed modulation and coding scheme. The back-off value affects a computed CQI so that a larger back-off yields a higher level of error protection, and a smaller back-off yields a lower level of error protection. The computed CQI may be quantized so that a range of back-off values yields the same level of error protection. Note that the back-off value may be applied to any step in the computation of the CQI, not necessarily the final result. For example, if the CQI is a modulation and coding scheme, which is selected based on the computation of one or many SINRs, the back-off value may be applied to the one or many SINRs.

In a system with link adaptation and a target BLER, the back-off value may be adaptively adjusted over time in order to meet the target. One example implementation of such an adaptive back-off is that the receiver continuously estimates the BLER and changes the back-off with a term proportional to the difference between the estimated BLER and the target BLER. Another example implementation is that the back-off value is increased or decreased depending on whether the latest block was correctly received. By proper assignment of the increase step-size and the decrease step-size, the target BLER can be approximately met. Note that a back-off value may also be used in a system where the channel quality can be directly estimated at the transmitter.

Referring now to FIG. 1, FIG. 1 is a functional block diagram illustrating a link adaptation system having an adaptive back-off module. The adaptive back-off module compares an estimated performance indicator to a target performance indicator in order to decide how to adapt a back-off value. The back-off value is used by the link adaptation module in a process of selecting (e.g., computing or generating) a CQI value. Because performance of a link typically depends on the selected CQI, the link adaptation system implements a control loop that aims at meeting the performance target.

In wireless communication systems employing multiple-input-multiple-output (MIMO) technology, the communication link may often be represented by a plurality of links, here called "layers." Each layer may have an individual channel quality or the layers may have the same channel quality. In many MIMO systems, it is possible to adapt the level of error protection on each layer separately. In such a system, it is beneficial to estimate and feed back CQIs, specific for each layer (or group of layers). In other MIMO systems, it is only possible to adapt the level of error protection on all layers simultaneously.

It is often beneficial to also adapt the number of layers that are used in the transmission, here called the "rank," in addition to the level of error protection on each layer. Some aspects in the selection of the CQIs may depend on the selected rank. Hence, it may be advantageous to have a back-off value for each possible rank. The link adaptation system illustrated in FIG. 1 is still applicable to the case with adaptive rank-specific back-off, but with rank-specific performance target, performance estimate and back-off values, and a back-off adaptation box per rank. Note that the rank, as used here, is not necessarily related to the rank of a MIMO channel matrix.

In a MIMO system with rank-specific back-off values that are adaptively adjusted to meet one or many performance targets (e.g., a target BLER) it is reasonable to adjust the back-off for a rank only when the rank is used. If only one of a multitude of ranks is used for a period of time, it is natural to adjust the back-off for the used rank based on the measured performance during a period of time. It is often not feasible to adjust the back-off of a rank based on measurements concerning the transmission with other ranks.

SUMMARY

In a MIMO system with adaptive rank-specific back-off values and a set of performance measure targets, the set of back-off values that would enable the system to meet the targets (here called the appropriate back-off values) may depend on the radio propagation environment and other time-variant parameters (e.g., a changing radio environment may affect the appropriate back-off values differently). We have determined that this may result in two problems. First, as time-variant parameters change, the back-off value for a particular rank (or ranks) may remain in an unnecessarily large state, resulting in that the rank is underutilized (e.g., not used or rarely used) for an unnecessarily long time period of time due to its unnecessarily large back-off value. Moreover, as time-variant parameters change in such a way, the back-off values of the used ranks are decreased, thereby further favoring these ranks over the underutilized ranks in the link adaptation (e.g., rank selection) process. This may significantly degrade performance. Second, due to changes in, among other things, the radio propagation environment, the back-off value of a rank that has been underutilized for a long time period may be too small. Once this underutilized rank is selected, a period of many block errors may immediately follow the selection before the back-off value is adjusted to an appropriate higher value. This may also significantly degrade performance. Accordingly, we have developed improved link adaptation systems and methods for overcoming the above and/or other disadvantages.

For example, in one aspect, the invention provides a method for adjusting a back-off value used for channel quality indicator estimation and rank selection for a communication link established between a first communication device and a second communication device. In some embodiments, this method includes the following steps: (a) determining a usage of the rank during a certain historical period of time; (b) determining if a criterion is fulfilled based, at least in part, on usage information determined in step (a); and (c) in response to determining that the criterion is fulfilled, favoring the rank in a rank selection by decreasing the back-off value associated with the rank as a function of time until the rank is selected again. In some embodiments, a lower back-off value corresponds to a lower level of error protection in the CQI selection and/or favoring of the associated rank in the rank selection than a higher back-off value.

In some embodiments, the method may further include: (d) determining if a second criterion is fulfilled based, at least in part, on usage information determined in step (a); (e) in response to determining that the second criterion is not fulfilled, computing a first CQI value based on a first back-off value associated with the rank; and (f) in response to determining that the second criterion is fulfilled, computing a second CQI value based on a second back-off value associated with the rank, wherein the second back-off value is greater than the first back-off value.

In some embodiments, the step of determining if the first criterion is fulfilled and/or the step of determining if the second criterion is fulfilled includes determining whether the rank is underutilized. The step of determining whether the rank is underutilized may include determining: (a) if the rank has not been used for a certain period of time within the historical period of time or (b) if the rank has been used less than a certain percentage during a certain period time within the historical period of time.

In some embodiments, the step of determining if the second criterion is fulfilled further comprises determining whether a certain amount of time has elapsed since the first time the rank was selected after having been determined to be underutilized. The step of computing the second CQI may include computing the second back-off value, wherein the second back-off value is a function of time. In some embodiments, the second back-off value is a function of (a) the amount time elapsed since the first time the rank was selected after having been determined to be underutilized and/or (b) of the first back-off value.

In another aspect, the invention provides an improved communication device. In some embodiments, the improved communication device is configured to perform the method described above.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Described herein are solutions to the two problems discussed above in the "summary" section. The solutions may be used separately or jointly.

A solution to the first problem discussed above includes determining all of the ranks that have not been used for at least a certain amount of time (e.g., 2 seconds) or determining all of the ranks that have been rarely used during a certain amount of time (e.g., ranks used less than X % of the time within a certain time period, where X is a configurable parameter), and, for each of these "underutilized" ranks, decreasing a back-off value for the rank as a function of time while the rank remains underutilized. For example, for a rank that has been idle (i.e., not used) for at least a certain amount of time, a back-off value for the rank may be decreased at regular or irregular time intervals until the rank is selected again. Similarly, for a rank that has rarely been used within a certain period of time, a back-off value for the rank may be decreased at regular or irregular time intervals until the rank is no longer a rarely used rank. This will have the effect of favoring the underutilized ranks in a rank selection process.

One solution to the second problem discussed above includes: selecting a rank, determining whether immediately prior to the selection of the rank, the rank was underutilized (e.g., idle or only rarely used) for at least a certain period of time, and if the selected rank was underutilized for at least the certain period of time, then adding an offset value to an original back-off value for the rank and using the increased back-off value in a CQI computation. This reduces the risk of a period of many block errors due to an incorrectly adapted back-off. The offset value is applied during an additional back-off duration, in order to enable a correct adaptation of the back-off value for the rank. The offset value may be successively decreased until it has no effect on the original back-off value. These two solutions shall be described below with reference to FIGS. 2-9. It should be noted that the test for determining whether a rank is underutilized with respect to the solution to the second problem may be different than the test for determining whether a rank is underutilized with respect to the solution to the first problem.

Figure 1:
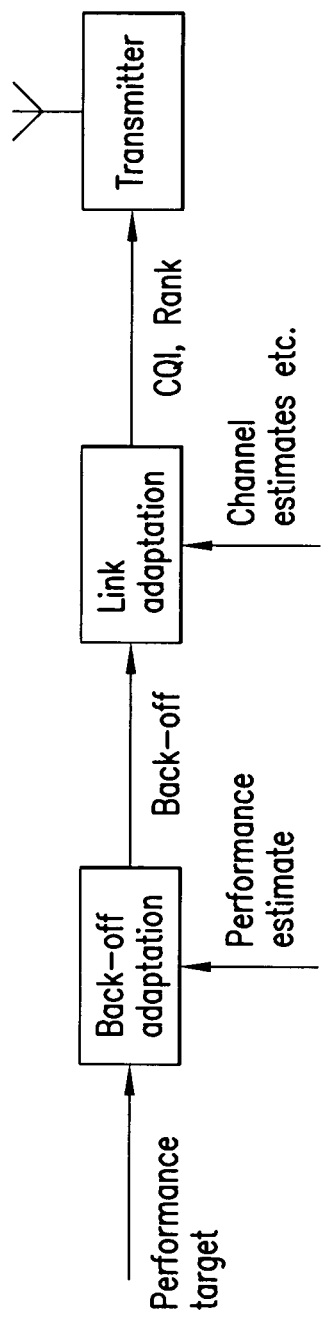
FIG. 1 is a functional block diagram illustrating a link adaptation system.
Figure 2:
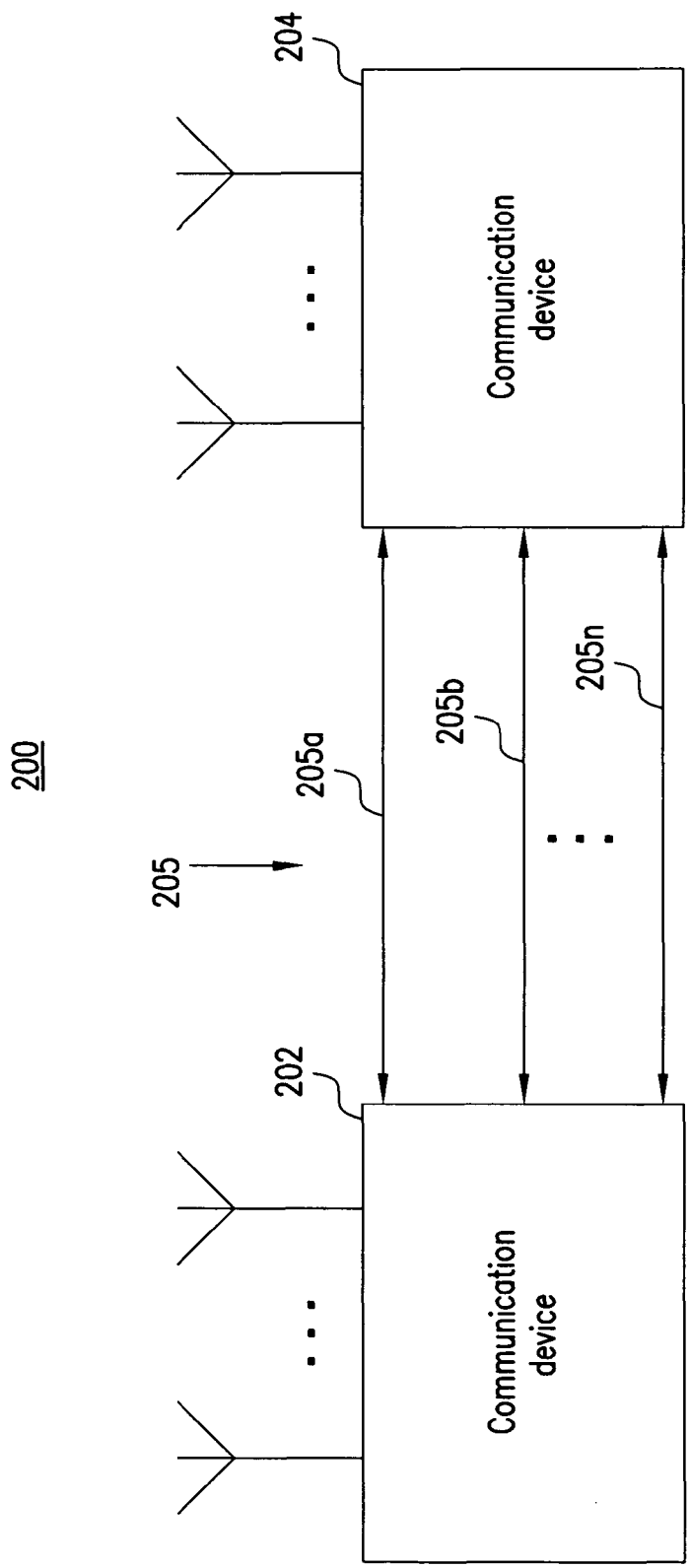
FIG. 2 illustrates a portion of a MIMO system according to some embodiments.

Referring now to FIG. 2, FIG. 2 illustrates a system 200 in which embodiments of the present invention may be employed. System 200 includes a first communication device 202 in communication with a second communication device 204. In the embodiment, shown, devices 202, 204 communicate with each other using a MIMO communication link 205. MIMO communication link 205 includes a set of layers 205a, 205b, . . . , 205n. As described above, the number of layers that are used is referred to as the "rank" of the communication link.

A back-off value is associated with each rank. The back-off value affects a computed channel quality indicator so that a larger back-off yields a higher level of error protection, and a smaller back-off yields a lower level of error protection. The computed channel quality indicator may be quantized so that a range of back-off values yields the same level of error protection.

The back-off values are also used in a process that results in a selection (or recommendation) of a rank to be used in the transmission. A smaller back-off value for a rank favors the selection of the rank, whereas a larger back-off penalizes the rank in the selection.

Figure 3:
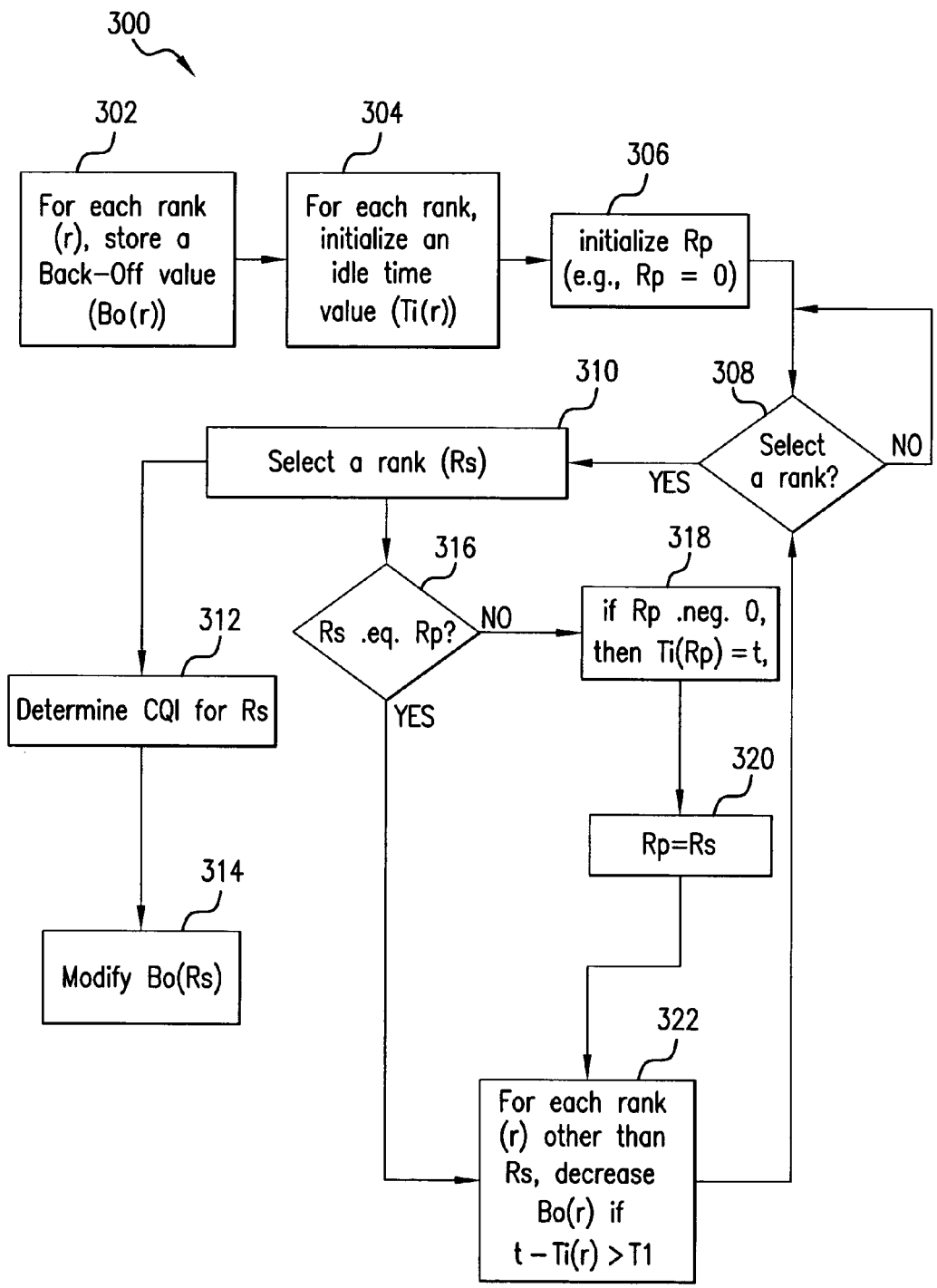
FIG. 3 is a flow chart illustrating a process according to some embodiments of the invention.

Referring now to FIG. 3, FIG. 3 is a flow chart illustrating a process 300, according to some embodiments, for implementing the first solution. Process 300 may be performed by device 202 or 204. Process 300 may begin in step 302, where, for each rank r of a MIMO communication link, an original back-off value (Bo) associated with the rank is stored (Bo(r) is the original back-off value for rank r). In step 304, for each rank r, a variable Ti(r) is initialized. For example, in some embodiments, Ti(r), for each rank, may be initialized to the current time (t) (i.e., Ti(r)=t, for r=1, 2, 3, . . . ). In these embodiments, Ti(r) identifies the time at which rank r transitioned from the non-idle state to the idle state. Alternatively, in other embodiments, Ti(r), for each rank, may be initialized to zero (0). In these embodiments, Ti(r) identifies the total amount of time rank r has been idle since last transitioning from a non-idle state to the idle state.

In step 306 variables Rs and Rp may be initialized to zero (0). Rp is used to identify the previously selected rank and Rs is used to identify the currently selected rank. In step 308, a determination is made as to whether it is time to perform a link adaptation process. If it is, process 300 may proceed to step 310, otherwise process 300 returns to step 308. In some embodiments, if step 308 returns an answer of "no", then before returning to step 308 process 300 may include the step of setting Ti(r) equal to (Ti(r)+1), for all r except r=Rs. In these embodiments, Ti(r) identifies the total amount of time rank r has been idle since last transitioning from a non-idle state to the idle state.

In step 310, a rank is selected. The selected rank is denoted Rs. In step 310, a rank is selected in dependence on, at least in part, the back-off values Bo for each rank. The selection may also depend on other parameters. After step 310, process 300 may proceed to steps 312 and 316.

In step 312, a CQI value is determined for Rs. The CQI value may depend on, among other things, Bo(Rs). In step 314, Bo(Rs) may be modified as soon as one or more performance measurements are obtained for Rs.

In step 316, a determination is made as to whether Rs equals Rp. If it does, step 322 is performed, otherwise step 318 is performed. In step 318, Ti(Rp) is set equal to t (e.g., the current time). Alternatively, Ti(Rp) may be set to zero. In step 320, Rp is set equal to Rs. In step 322, for each rank r other than Rs, Bo(r) is decreased if, and only if, the rank r has been idle for at least a threshold amount of time (T1). For example, in the embodiment where Ti(r) identifies the time at which rank r transitioned from the non-idle state to the idle state, if (t−Ti(r))>T1, then Bo(r) is decreased by some amount. Likewise, in the embodiment where Ti(r) itself identifies the total amount of time rank r has been idle since last transitioning from a non-idle state to the idle state, if Ti(r)>T1, then Bo(r) is decreased by some amount. In some embodiments, Bo(r) is decreased by some amount such that Bo(r) decreases linearly. After step 322, process 300 may return to step 308.

In the manner described above, a rank that has not been used for at least a certain period of time (T1) is determined and the rank's corresponding back-off value is then successively decreased until the rank is selected again, thereby favoring the rank in the adaptation process. The period of time may be arbitrarily small or large. Also, the back-off may decrease linearly with time or may follow some other decreasing function of time.

Figure 4A:
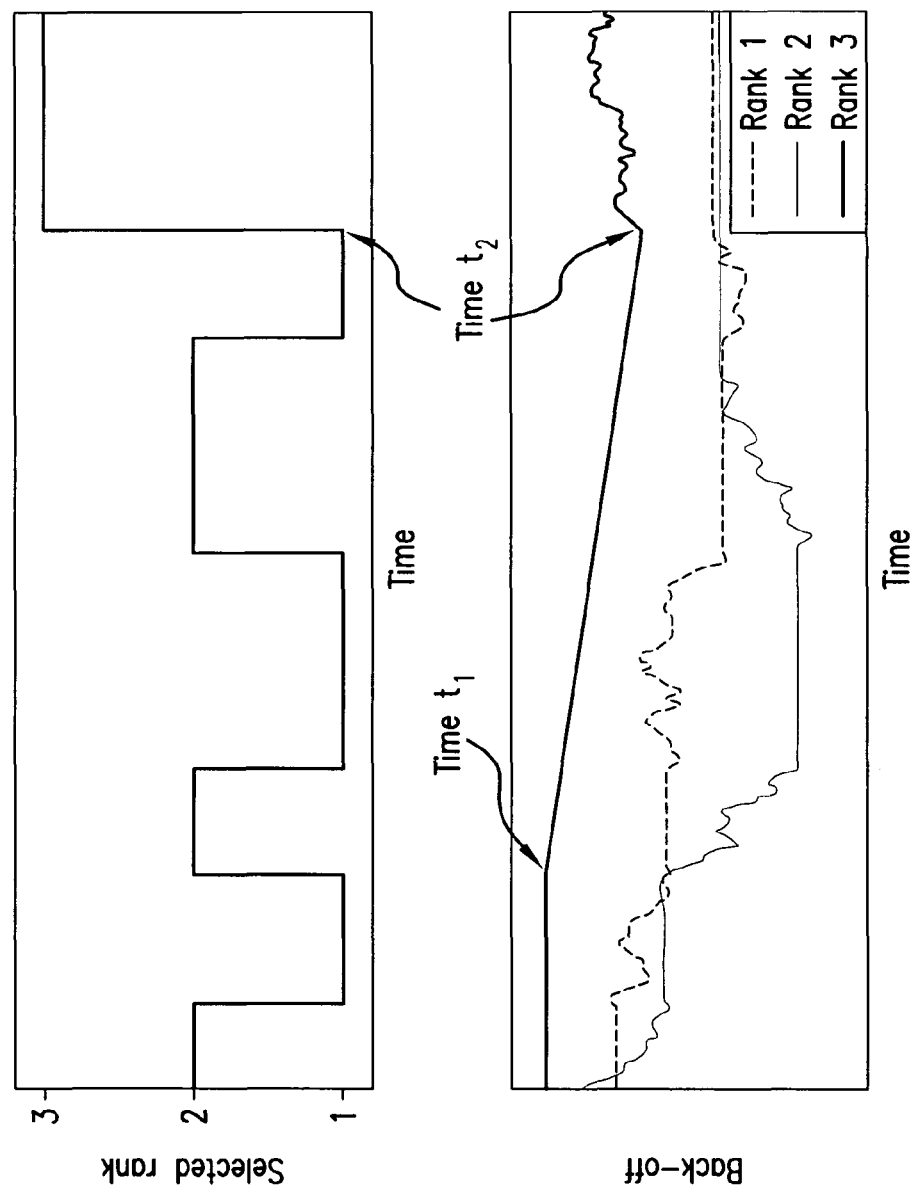
FIGS. 4A and 4B illustrate various timing diagrams that illustrates aspects of the invention according to some embodiments.

Referring now to FIG. 4A, FIG. 4A exemplifies the above described process. In the example, there are three possible ranks (ranks 1, 2 and 3). The upper figure shows the selection of ranks over time (i.e., for each point in time, the upper figure shows the rank that is selected at that point in time). The lower figure shows, for each rank, the rank's back-off value (i.e., the lower figure shows Bo(r) at different points in time for r=1, 2 and 3). As shown in FIG. 4, at time t1, the back-off for rank 3 starts to be successively decreased (linearly in this example), even though rank 3 is not selected for transmission. At time t1 the back-off for rank 3 starts to be successively decreased because (t1−Ti(3))>T1 or, at time t1, Ti(3)>T1, depending on whether (a) Ti(3) equals the time at which rank 3 last transitioned from the non-idle state to the idle state or (b) Ti(3) identifies the total amount of time rank 3 has been idle since last transitioning from a non-idle state to the idle state, respectively. At time t2, rank 3 is selected for transmission again, and the successive decrease of the rank 3 back-off is turned off. Instead, the back-off is adapted based on the rank 3 transmission.

Figure 4B:
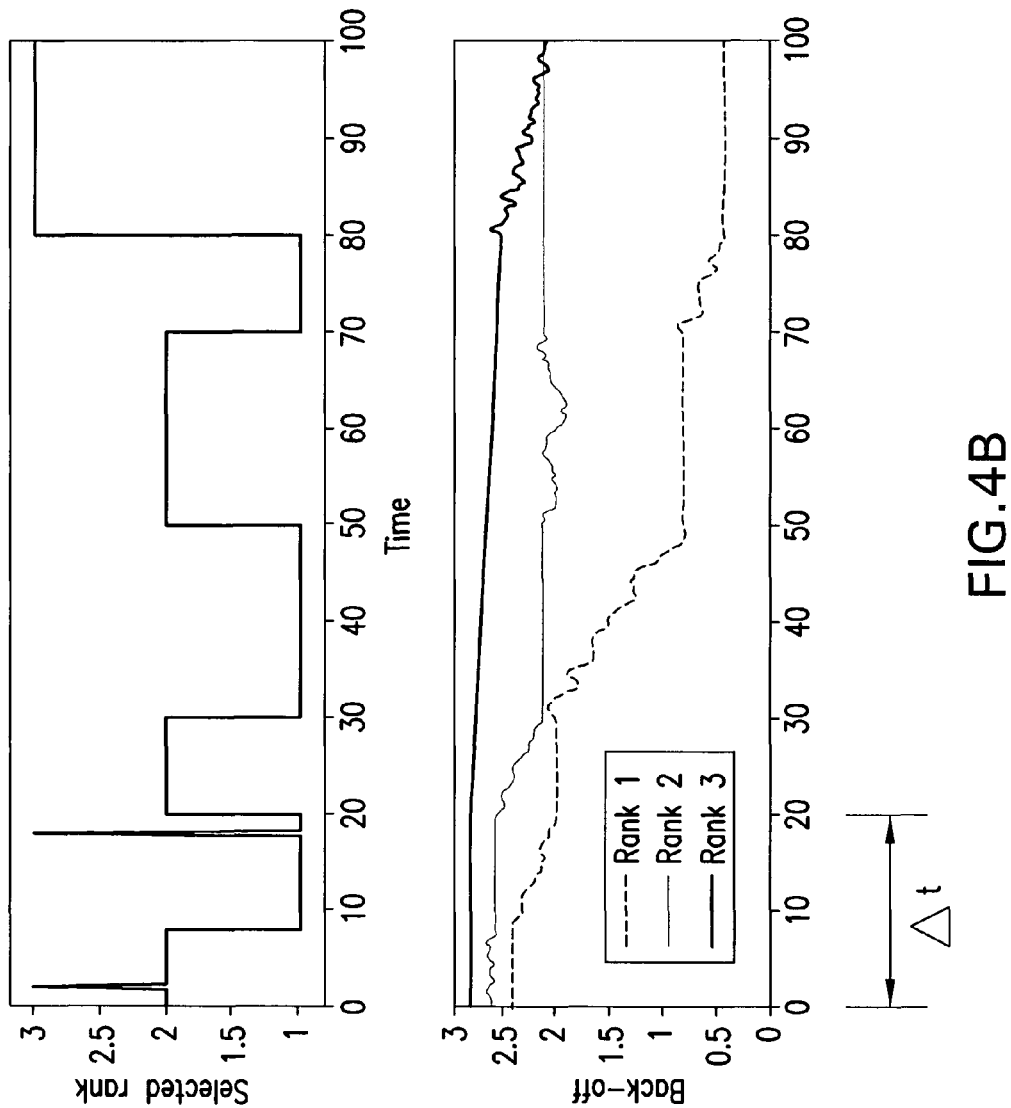

Referring now to FIG. 4B, FIG. 4B illustrates that once the system determines that a rank was rarely used within a certain historical period of time, the system decreases the back-off value for the rank until the rank is selected again. For example, as shown in FIG. 4B, in the historical time period represented by delta-t, rank 3 was rarely used. Accordingly, at the end of the delta-t time period (i.e., at time t=20), the system begins the process of reducing the back-off value for rank 3, at regular or irregular intervals, until rank 3 is again selected. In this manner, after time t=20, the probability that rank 3 will be selected increases over time.

FIGS. 4A and 4B illustrate that, once the system determines that a rank is underutilized, the system can automatically increase the likelihood that the rank will be selected by a rank selection process by, for example, periodically decreasing a back-off value for the rank while the rank remains underutilized.

Figure 5:
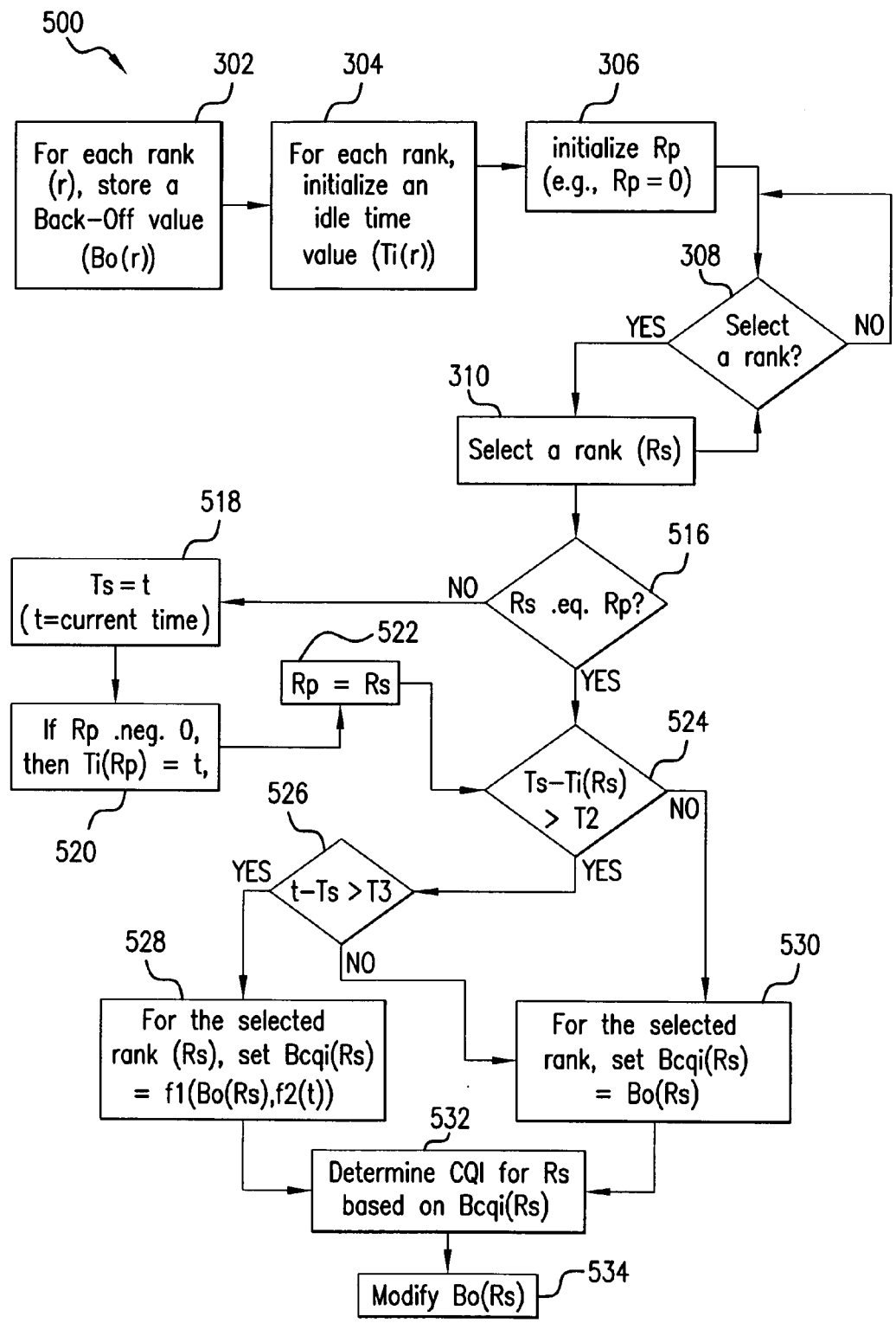
FIG. 5 is a flow chart illustrating a process according to some embodiments of the invention.

Referring now to FIG. 5, FIG. 5 is a flow chart illustrating a process 500, according to some embodiments, for implementing the second solution. Process 500 may be performed by device 202 or 204. As illustrated in FIG. 5, the first five steps of process 500 may be the same as the first five steps of process 300. That is, process 500 may begin my performing steps 302-310. After step 310, process 500 proceeds to step 516 and step 308.

In step 516, a determination is made as to whether Rs equals Rp. If Rs equals Rp, then step 524 is performed, otherwise step 518 is performed. In step 518, the variable Ts is set equal to the current time (t). Accordingly, the variable Ts stores the time at which the rank Rs was selected. In step 520, Ti(Rp) is set equal to t. As described above, Ti(r) is a variable that stores the time at which rank r transitioned from the non-idle state to the idle state. In step 522, Rp is set equal to Rs.

In step 524, a determination is made as to whether (Ts−Ti(Rs))>T2, where T2 is a threshold value. That is, in step 524, a determination is made as to whether the selected rank was first selected after being idle for at least some amount of time. If (Ts−Ti(Rs)) is greater than T2, then process 500 proceeds to step 526, otherwise it proceeds to step 530.

In step 526, a determination is made as to whether (t−Ts)>T3, where T3 is a threshold and t represents the current time. That is, in step 526, a determination is made as whether a specified amount of time (e.g., T3) has elapsed since the selected rank transitioned from the idle state to the non-idle state. If (t−Ts) is greater than T3, then process 500 proceeds to step 530, otherwise it proceeds to step 528.

In step 528, a value Bcqi(Rs) is set equal to f1(Bo(Rs), f2(t−Ts)), which, in some embodiments, equals Bo(Rs)+f2(t−Ts), where Bo(Rs) is the back-off value associated with the selected rank, and f2(x), in some embodiments, is of the form (−a*x/T3+a), where "a" is a constant. In step 530, Bcqi(Rs) is set equal to Bo(Rs). In step 532, a CQI value for the selected rank is determined based, at least in part, on Bcqi(Rs). In step 534, Bo(Rs) may be modified as soon as one or more performance measurements are obtained for Rs.

As illustrated above, in some embodiments, for each rank r, we define a resulting back-off value (Bcqi), an original back-off value (Bo), and an offset value (O). The resulting back-off value is used in a channel quality indicator computation, instead of the original back-off value. In the rank selection process, the original back-off value is used. Under certain conditions, the resulting back-off value for a particular rank is a function of the original back-off value and offset for the particular rank, while in other conditions the resulting back-off value simply equals the original back-off value. There may be different functions for different ranks. For example, for some or all ranks, the resulting back-off value may be the sum of the original back-off value and the offset (i.e., for some ranks Bcqi(r)=f(Bo(r),O(r)). The offset is designed to reduce the risk of a period of many block errors due to an incorrectly adapted original back-off.

Figure 6:
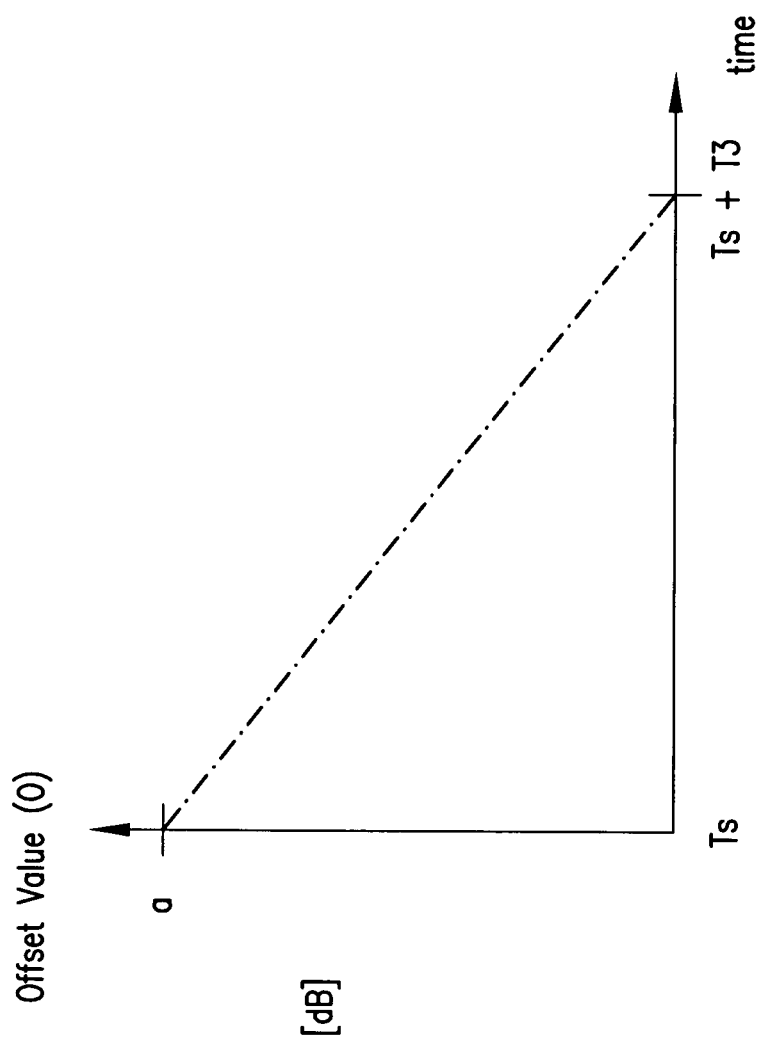
FIG. 6 illustrates a function of time according to some embodiments.
Figure 7:
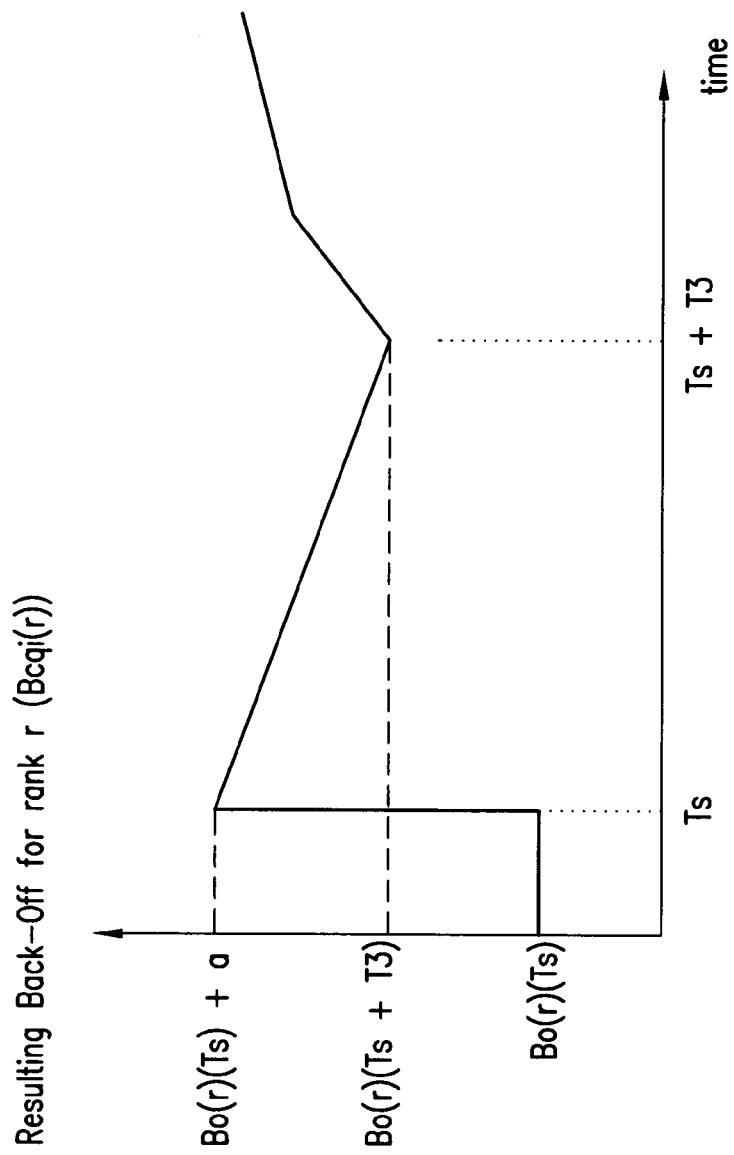
FIG. 7 illustrates a back-off value changing over time in the case where an offset value is used to adapt the back-off value.

In some embodiments, the offset value is a function of time. This function may be such that, for a constant original back-off, the resulting back-off initially is higher than the original back-off, but then decreases with time. For example, as illustrated above, in some embodiments the offset value for a rank may equal the following function: (((−a)(t−Ts)/T3)+a), which is illustrated in FIG. 6. In the example illustrated by FIG. 6-8, the back-off is applied to an SNR in dB scale. In some embodiments, the offset value for a rank is used only when Ts(r)−Ti(r)>T2 and, furthermore, is only used for a certain period of time (e.g., T3 amount of time). As described above, Ts(r) is the time at which the rank transitioned from the idle state to the used state (i.e., non-idle state), and Ti(r) is the time at which the rank transitioned from the non-idle state to the idle state. This embodiment is illustrated in FIG. 7, which assumes that Ts(r)−Ti(r)>T2 and also assumes that the offset value is a decreasing function of time as shown in FIG. 6. As shown in FIG. 7, at time Ts (i.e., the time at which the rank is selected), the resulting back-off value (Bcqi) is higher than the original back-off value Bo at time Ts because the offset value is added to the original back-off to produce the resulting back-off (i.e., Bcqi(r)(Ts)=Bo(r)(Ts)+Offset(r)(Ts)), thereby resulting in a lower SNR estimate and hence more defensive choices of CQIs. As the additional back-off value decreases slowly, the underlying original back-off may slowly adapt to an appropriate value without a period of very low performance. If Bo remains constant, as time increases, then Bcqi(r) decreases until time Ts+T3, at which point Bcqi(r) will simply follow Bo(r).

Figure 8:
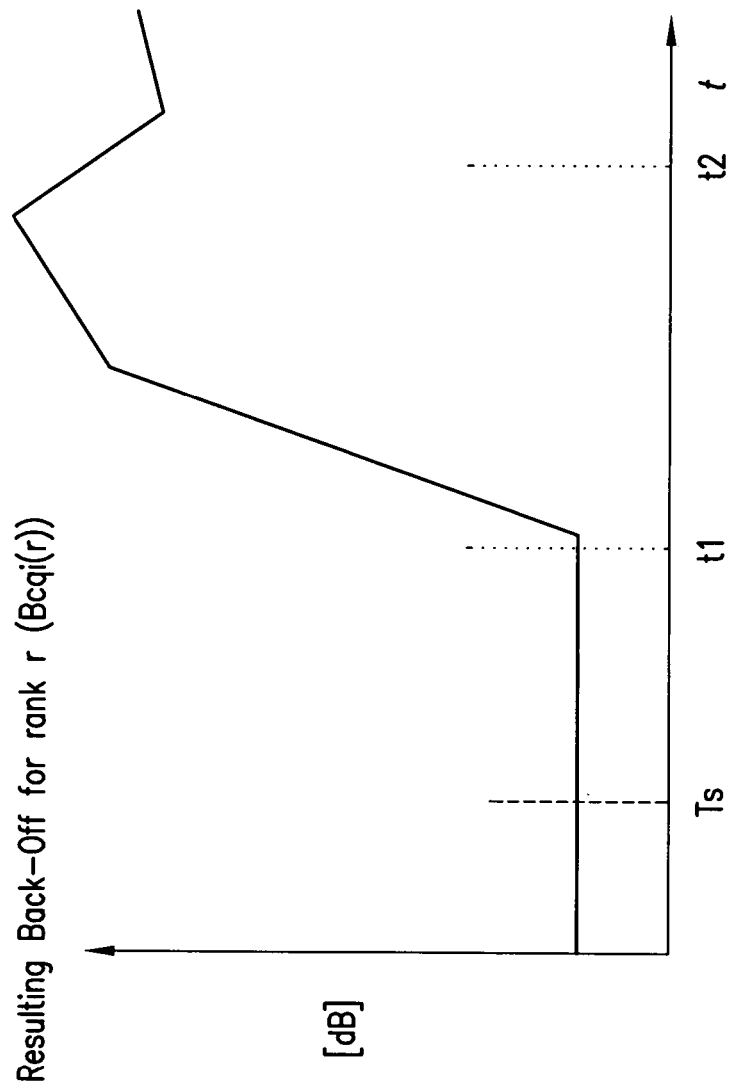
FIG. 8 illustrates a back-off value changing over time, where an offset value is not used to adapt the back-off value.

For the sake of comparison, FIG. 8, shows the resulting back-off value for the rank where an offset value is not employed (i.e., Bcqi(r)=Bo(r) for all time). At time Ts, the rank is selected again after a long time period of not being selected. In this example, the starting back-off for the rank at time Ts is too low, resulting in unnecessarily low performance (e.g. a large number of block errors) following time Ts. Due to the inherent time delay between transmission and performance evaluation, the back-off is not increased until after time t1. Between time t1 and time t2, the back-off is successively adapted to higher values, due to the performance estimates (e.g. block errors) based on the transmissions between times Ts and t1. After time t2, the back-off stabilizes to a value that yields the target performance estimate, for instance the target BLER.

Figure 9:
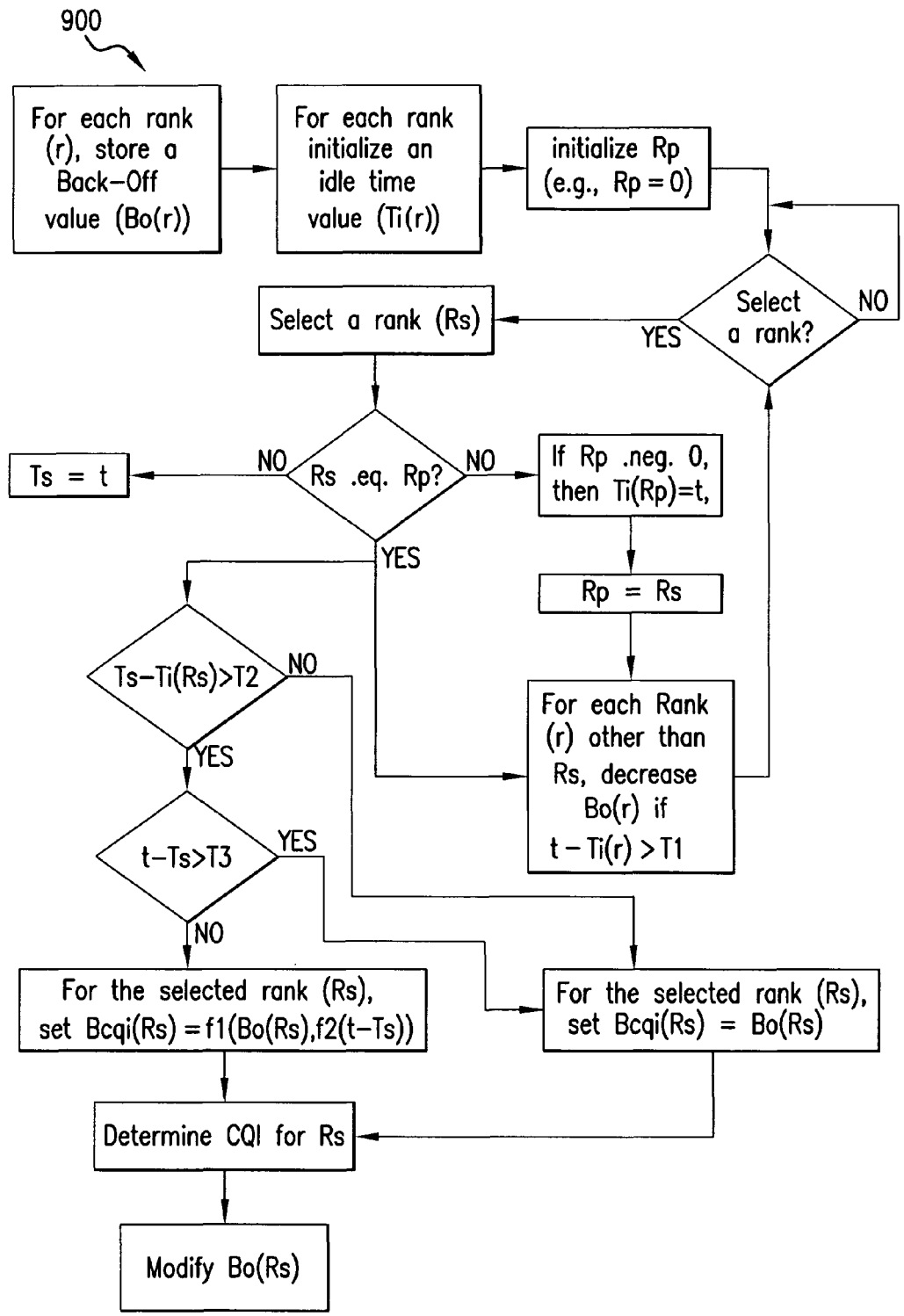
FIG. 9 is a flow chart illustrating a process according to some embodiments of the invention.

Referring now to FIG. 9, FIG. 9 is a flow chart illustrating that the two above described improvements may be employed together.

Figure 10:
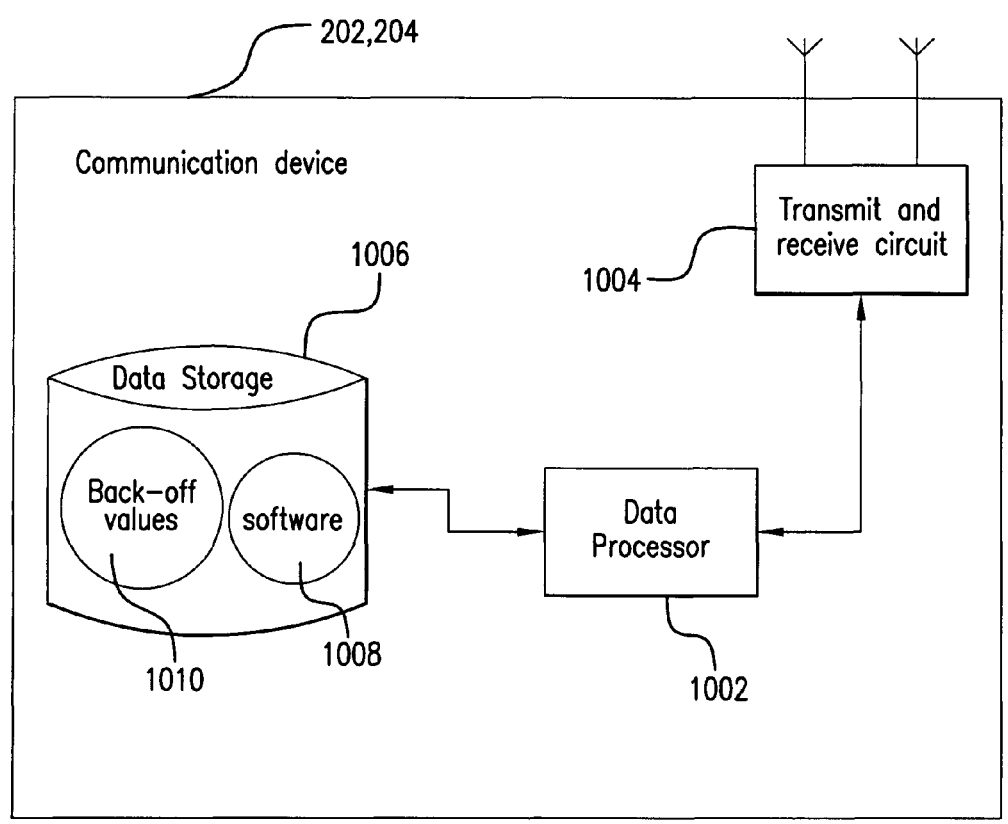
FIG. 10 is a functional block diagram of a communication device according to some embodiments of the invention.

Referring now to FIG. 10, FIG. 10 is a functional block diagram of a communication device 202, 204 according to embodiments of the invention. As shown, the communicate device may comprise a CPU 1002, a data storage unit 1006 (e.g., a non-volatile storage device) and computer software 1008 stored on the storage unit 1006. A set of back-off values may also be stored in storage unit 1006, as well as other parameters. The communication device may also comprise transmit/receive (Tx/Rx) circuitry 1004 for transmitting data to and receiving data from another communication device. Software 1008 is configured such that when processor 1002 executes software 1008, the device performs steps described above with reference to the flow charts shown in FIGS. 3, 5 and 8. For example, software 1008 may include computer instructions for, among other things, (a) determining whether a rank has not been used for at least a certain period of time, and (b) decreasing, at regular or irregular intervals, a back-off value associated with the rank while the rank remains unused in response to determining that the rank has not been used for at least the certain period of time.

While various embodiments of the present invention have been described above, it should be understood that they have been presented by way of example only, and not limitation. Thus, the breadth and scope of the present invention should not be limited by any of the above-described exemplary embodiments.

Additionally, while the processes described above and illustrated in the drawings are shown as a sequence of steps, this was done solely for the sake of illustration. Accordingly, it is contemplated that some steps may be added, some steps may be omitted, and the order of the steps may be re-arranged.

What is claimed is:

1. A method for a multiple input multiple output (MIMO) communication link established between a first communication device and a second communication device where the MIMO communication link includes a number of layers corresponding to a rank of the MIMO communication link, where different numbers of layers correspond to different ranks, and where a back-off value is associated with each of the different ranks, the method implemented in the first communication device comprising:
(a) determining, by a computer processor, a usage of the different ranks for the MIMO communication link during a certain historical period of time, wherein the usage of each rank corresponds to an amount or proportion of time in which the rank is in a non-idle state during the certain historical period of time;
(b) determining, by the computer processor, if a first criterion is fulfilled for each of the ranks based, at least in part, on usage information determined in step (a), wherein the first criterion is fulfilled for a rank if the amount or proportion of time in which the rank is in the non-idle state during the certain historical period of time is less than a defined value;
(c) in response to determining that the first criterion is fulfilled for at least one rank among the different ranks, favoring, by the computer processor, the at least one rank for which the first criterion is fulfilled, in a rank selection for the MIMO communication channel link by decreasing a first back-off value associated with the at least one rank;
(d) determining if a second criterion is fulfilled based, at least in part, on usage information determined in step (a);
(e) in response to determining that the second criterion is not fulfilled, computing a channel quality indicator (CQI) value based on the first back-off value; and
(f) in response to determining that the second criterion is fulfilled, computing the CQI value based on a second back-off value associated with the one rank, wherein the second back-off value is greater than the first back-off value.

2. The method of claim 1, wherein the second back-off value is greater than the first back-off value to ensure a sufficient level of error protection.

3. The method of claim 1, wherein the step of determining if the first criterion is fulfilled and/or the step of determining if the second criterion is fulfilled comprises determining whether the one rank is underutilized.

4. The method of claim 3, wherein the step of determining whether the one rank is underutilized comprises determining: (a) if the one rank has not been used for a certain period of time within the historical period of time or (b) if the one rank has been used less than a certain percentage during a certain period of time within the historical period of time.

5. The method of claim 3, wherein the step of determining if the second criterion is fulfilled further comprises determining whether a certain amount of time has elapsed since the first time the one rank was selected after having been determined to be underutilized.

6. The method of claim 1, wherein the step of computing the CQI value based on the second back-off value comprises computing the second back-off value, wherein the second back-off value is a function of time.

7. The method of claim 1, wherein the second back-off value is a function of (a) the amount of time elapsed since the first time the one rank was selected after having been determined to be underutilized or (b) the accumulated time the one rank has been used since the first time the one rank was selected after having been determined to be underutilized.

8. The method of claim 1, wherein the second back-off value is a function of said first back-off value.

9. A first communication device for communication via a multiple input multiple output (MIMO) communication link with a second communication device, where the MIMO communication link includes a number of layers corresponding to a rank of the MIMO communication link, where different numbers of layers correspond to different ranks, and where a back-off value is associated with each of the different ranks, the first communication device comprising:
one or more processors connected to the transmit and receive circuitry and configured to:
(a) determine a usage of the different ranks for the MIMO communication link during a certain historical period of time, wherein the usage of each rank corresponds to an amount or proportion of time in which the rank is in a non-idle state during the certain historical period of time;
(b) determine if a first criterion is fulfilled for each of the ranks based, at least in part, on usage information determined in step (a), wherein the first criterion is fulfilled for a rank if the amount or proportion of time in which the rank is in the non-idle state during the certain historical period of time is less than a defined value;

(c) favor at least one rank among the different ranks for which the first criterion is fulfilled, in a rank selection for the MIMO communication link in response to determining that the criterion is fulfilled for the at least one rank by decreasing a first back-off value associated with the at least one rank;

(d) determine if a second criterion is fulfilled based, at least in part, on usage information determined in step (a);

(e) compute a channel quality indicator (CQI) value based on the first back-off in response to determining that the second criterion is not fulfilled; and (f) compute the CQI value based on a second back-off value associated with the one rank in response to determining that the second criterion is fulfilled, wherein the second back-off value is greater than the first back-off value.

10. The first communication device of claim 9, wherein the second back-off value is greater than the first back-off value to ensure a sufficient level of error protection.

11. The first communication device of claim 9, wherein the first communication device is configured to determine if the first criterion is fulfilled and/or if the second criterion is fulfilled by determining whether the one rank is underutilized.

12. The first communication device of claim 11, wherein the first communication device is configured to determine whether the rank is underutilized by determining (a) if the one rank has not been used for a certain period of time within the historical period of time or (b) if the one rank has been used less than a certain percentage during a certain period time within the historical period of time.

13. The first communication device of claim 11, wherein the first communication device is configured to determine whether the second criterion is fulfilled by determining whether a certain amount of time has elapsed since the first time the one rank was selected after having been determined to be underutilized.

14. The first communication device of claim 9, wherein the first communication device is configured to compute the CQI value based on the second back-off value by first computing the second back-off value, wherein the second back-off value is a function of time.

15. The first communication device of claim 9, wherein the first second back-off value is a function of (a) the amount of time elapsed since the first time the one rank was selected after having been determined to be underutilized or (b) the accumulated time the one rank has been used since the first time the rank was selected after having been determined to be underutilized.

16. The first communication device of claim 9, wherein the second back-off value is a function of said first back-off value.

* * * * *